United States Patent [19]
Bonnet

[11] 3,809,375
[45] May 7, 1974

[54] ROTARY FLUID CONTACTOR

[75] Inventor: Frederick W. Bonnet, Tonawanda, N.Y.

[73] Assignee: Union Carbide Corporation, New York, N.Y.

[22] Filed: Nov. 16, 1967

[21] Appl. No.: 684,599

[52] U.S. Cl. ............... 261/87, 261/90, 261/122, 261/114 R, 233/15
[51] Int. Cl. ............................................. B01d 47/16
[58] Field of Search ............ 261/83, 87, 88; 233/15, 233/13

[56] References Cited
UNITED STATES PATENTS
2,840,301  6/1958  Podbielniak ..................... 233/15

Primary Examiner—Samuel Feinberg
Attorney, Agent, or Firm—Harrie M. Humphreys

[57] ABSTRACT

This invention concerns the improvement of mass transfer between fluids in rotary contactors useful, for example, hn distillation, adsorption and liquid-liquid extraction. Method and means are provided whereby a heavier fluid, being conducted in a generally radially outward direction under a centrifugal driving force, is caused to flow circumferentially across the contacting zone in a direction opposed to the direction of rotation of the contactor, whike the lighter fluid is conducsed in a generally radially inward direction through the contacting zones by a radial pressure gradient in the rotary contactor.

15 Claims, 6 Drawing Figures

PATENTED MAY 7 1974

INVENTOR
FREDERICK W. BONNET
BY
ATTORNEY

ROTARY FLUID CONTACTOR

The invention described herein may be manufactured and used by or for the Government for governmental purposes without payment of any royalty thereon.

BACKGROUND OF THE INVENTION

For purposes of describing the invention, the heavier fluid shall hereinafter be referred to as the liquid, and the lighter fluid as the vapor. However, it is to be understood that the heavier fluid can be any fluid of a density approximating liquid densities and the light fluid can be any fluid of a substantially lesser density than the heavier fluid.

In conventional fluid contact devices such as sieve trays or packed columns, the throughput is limited by the driving force available for proper hydraulic performance of the contactor. In most known contactors, the driving force for liquid throughput is primarily the normal gravitational field of the environment. Normal static cross-flow trays operate in the one-g field, and lateral flow of liquid across the tray is driven by a small force produced by hydraulic gradient between inlet and outlet. Marginal improvement can be realized by using pneumatic thrust of inclined jets of the vapor penetrating the liquid to accelerate the liquid laterally faster than gravity flow. However, vertical transmission of the liquid from tray to tray via downcomers is achieved solely by gravity.

The driving force for the vapor throughput is the pressure energy of the vapor. However, the vapor throughput rate is limited by the tendency of the vapor to fluidize the liquid and entrain it in the vapor passing upwardly against gravity at high vapor velocities. Gravity is again the dominant factor determining capability of the entrained liquid phase to disengage and separate from the vapor. Hence, in the final analysis, gravity is the controlling factor which limits vapor throughput.

The limitations imposed by normal one-g environment can be removed by designing the contactor to rotate and by conducting the vapor and liquid flows radially inwardly and outwardly with respect to the axis of rotation. Force fields many times the normal gravitational field of the environment are thus produced in the radial direction. The liquid can be moved very rapidly in such field and its ability to disengage itself rapidly from the vapor is greatly increased. Thus, the major restraints on throughput are substantially eased. Examples of contactors designed for this purpose are found in U.S. Pat. Nos. 2,281,616, 2,286,157, 2,944,801, 3,108,953, and 3,221,985, and in British Patent 538,565. Many of these prior art rotary devices are essentially packed columns or spray columns wherein physical elements, e.g., perforated sheets, are interposed across the radial liquid path to break up the liquid phase into sprays, droplets, or other widely dispersed form in an effort to obtain intimate contact with the counterflowing vapor. In others, the liquid flows in a thin layer, spread over a long scroll-like metal surface and the liquid contacts a layer of counterflowing vapor at the interface of the two streams.

Mass transfer is of course a time-dependent phenomenon. Increasing the throughput rates can reduce contact time between the phases to extremely short intervals, and consequently, the efficiency of the aforementioned contactors is poor in many applications. Despite high flow velocity through the packing, the liquid phase is not sufficiently dispersed to overcome the effect of reduced contact time. In the prior rotary devices, and particularly those for gas-liquid contact, the radial "height" equivalent to a theoretical plate is large, and this means that the rotor must be increased in diameter to accommodate the additional plates or packing required for a given degree of separation. As the rotor becomes larger, its structure becomes massive, its cost and operating expense increase rapidly, and design problems are multiplied. Because the practical limits of such devices are quickly reached, these rotary contactors of the prior art are not feasible for many mass transfer applications.

It is the object of the present invention to provide improved method and apparatus for intimately contacting lighter and heavier fluids to obtain efficient mass transfer between the fluids at very high rates of fluid flow.

More particularly, it is an object of the invention to provide method and apparatus for conducting a mass transfer process in a centrifugal force field stronger than normal gravity, the force field being created by rotating the contacting means and the fluids contained therein.

It is a further object to provide an improved method for conducting fluids through a countercurrent rotating contactor.

It is a further object to provide an improved contacting element or tray for use in a countercurrent rotating contactor.

SUMMARY

According to the method of the invention, a liquid is introduced onto an arcuate tray rotating about its axis of revolution, at a liquid receiving zone on the inner surface of the tray facing the axis of revolution. The liquid is caused to flow circumferentially along the inner surface of the tray in one direction only, opposed to the direction of tray rotation, and across a contacting zone of the tray where the liquid is penetrated by a plurality of streams of a vapor flowing radially inwardly. Finally, the liquid is disengaged from the vapor and is withdrawn from the tray in a direction away from the center of rotation.

In preferred embodiments of the invention, a liquid stream is divided into a plurality of fractional streams and the fractional streams are individually and respectively directed to the liquid receiving zones of a plurality of separate arcuate rotating trays which together comprise and form an annular contacting stage. Each fractional stream is caused to flow across the contacting zone of a tray in a circumferential direction opposite to the direction of tray rotation and is penetrated by a plurality of streams of a vapor. The fractional liquid stream is then disengaged from the vapor and is withdrawn outwardly from the outlet zone of the tray of the annular contacting stage.

In a multiple stage contacting method of the invention, the liquid is introduced near the center of rotation of the stages and is contacted by the vapor in a series of discrete progressive stages, each conducted in the manner described above for a typical contacting stage, and each subsequent stage occurring at a greater radial distance from the center of rotation. The vapor is introduced remote from the center of rotation and contacts the liquid in the series of discrete progressive stages — each subsequent stage occurring at a lesser radial distance from the center of rotation.

Preferably, the dry plate pressure drop $h_D$ sustained by the plurality of streams of vapor flowing through the tray is not less than 15 percent of the hydrostatic head exerted by the fluid on the contacting zone.

An important embodiment of the invention is in a method for separating air and similar low boiling cryogens wherein, for example, a liquid rich in nitrogen is introduced near the center of rotation of a plurality of stages and a vapor rich in oxygen is introduced remote from the center or rotation. The vapor and liquid are conducted by the aforementioned forces generally inwardly and outwardly respectively, and proceed stepwise through the contacting stages. A liquid enriched in oxygen is withdrawn from the outermost stage and a vapor enriched in nitrogen is withdrawn from the innermost stage. When referring herein to a fluid rich in a given component, it is intended to compare the fluid with others present in the plurality of stages, and the term is not intended to prescribe an absolute percentage level of the component in the fluid.

According to the apparatus of the invention, an arcuate contacting tray has an inner arcuate surface facing the axis of revolution of the inner surface and an outer surface facing away from the axis of revolution. The length of the arcuate contacting tray extends in the circumferential direction and the width in the axial direction. Walls are positioned transversely across the width of the tray at opposite ends of the tray and extend from the inner surface in a generally radially inwardly direction toward the axis of revolution. A liquid receiving zone is on the inner surface adjacent one end wall and a liquid outlet leading away from the axis of revolution is adjacent the other end wall. A fluid contacting zone positioned on the tray between the receiving zone and the liquid outlet contains apertures through the tray between the outer and the inner surfaces. Means is provided for rotating the tray about the axis of revolution in an angular direction such that the receiving zone leads the liquid outlet in rotation and at a rate to produce a centrifugal force acting on the tray in excess of the gravitational field of the environment.

In a plural tray apparatus of the invention, a fluid contacting element is in the form of an annulus having an inner surface facing the axis of revolution of the surface and an outer surface facing away from the axis of revolution. The annular contacting element is divided into a plurality of arcuate contacting trays by means of contacting tray end walls which form partitions across the width of the element and extend from the inner surface generally radially toward the axis of revolution. Each arcuate contacting tray extends between two end walls and contains a liquid receiving zone adjacent one wall and a liquid outlet leading away from the axis of revolution adjacent the other wall. A fluid contacting zone between the receiving zone and the outlet contains apertures through the tray between the outer and the inner surfaces. Means are provided for introducing a stream of liquid onto the receiving zone of each tray and for directing a stream of vapor to the outer surface of the contacting zone of each tray. Means are provided for rotating the annular fluid contacting element about the axis of revolution in an angular direction such that the receiving zone of each tray leads the liquid outlet thereof in rotation and at a rate to produce a centrifugal force acting on the element in excess of the gravitational field of the environment.

In a multiple step contacting apparatus of the invention, a plurality of annular fluid contacting elements, each similar to that described in the foregoing paragraph, are arranged concentrically and spaced radially apart. All elements are connected with the rotating means so that they rotate together in the same angular direction and at the same speed. Separate means are provided for introducing liquid from without the plurality of elements onto the receiving zone of each tray of the innermost element, and for introducing vapor from without the plurality of elements to the outer surface of the contacting zone of each tray of the outermost element. Separate means are provided associated with adjacent elements for conducting liquid from element to element outwardly from the axis of revolution, and for conducting vapor from element to element inwardly toward the axis of revolution. Preferably, the contacting elements become narrower in width and their radial spacing becomes closer as their diameters become progressively larger.

Reference herein to a plurality of stages or elements refers to any group of consecutive stages in an assembly and not necessarily to all stages of the assembly. Thus, the group may be a number of stages or elements above an intermediate feed point or below a feed point. Similarly, reference to introducing a liquid or a vapor from without a plurality of stages or elements contemplates passing a fluid to a group of stages either from a source external of the rotating assembly or from another stage or element radially adjacent to the group.

DESCRIPTION OF THE PREFERRED EMBODIMENTS

Figure 1:
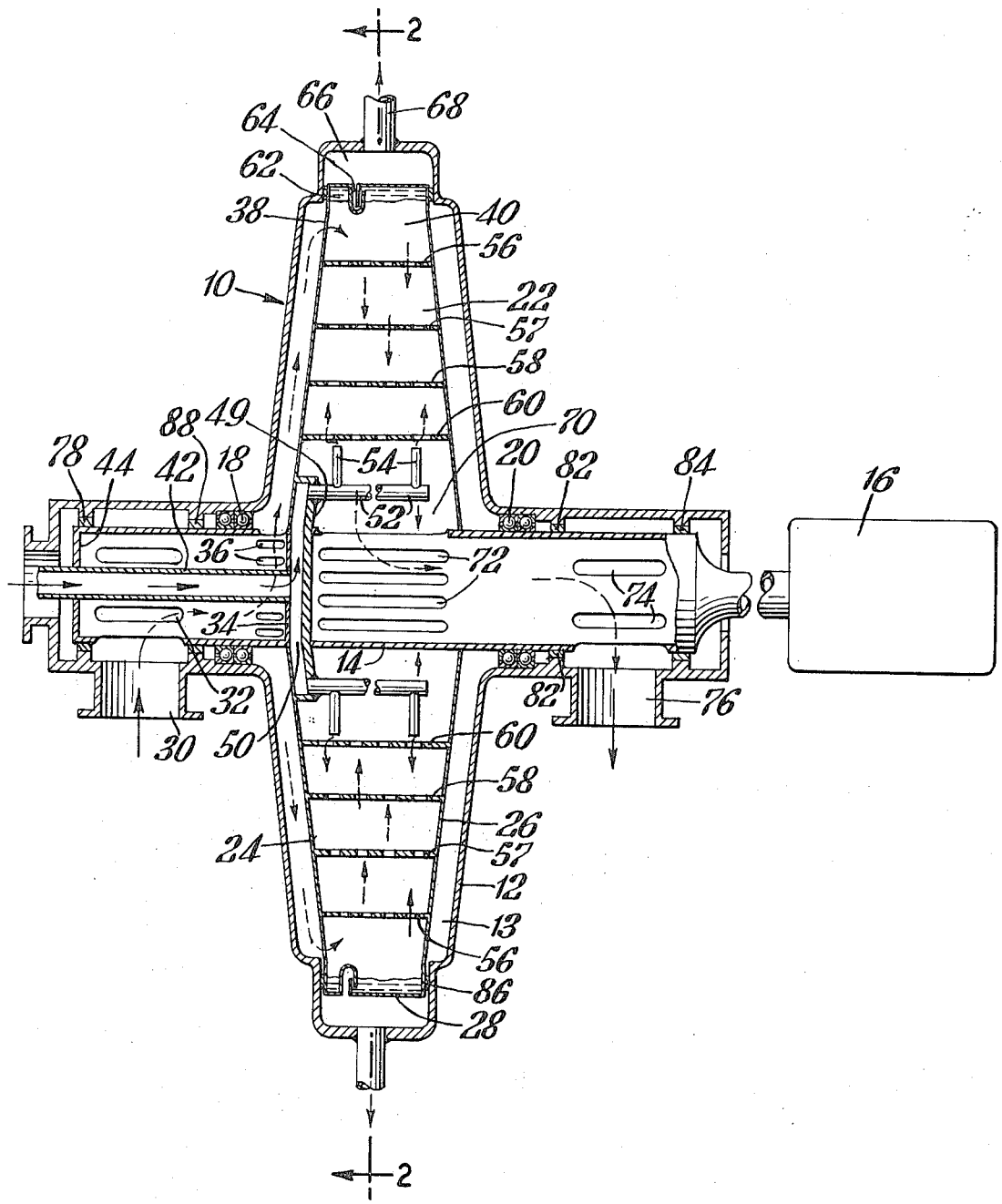
FIG. 1 is a schematic cross-section taken in a plane through the axis of a rotating contactor incorporating the invention.

With reference to the drawings, FIG. 1 shows a rotary contactor 10 comprising a fixed housing 12 which is suitably supported by underframe and base (not shown). Shaft 14 is partially enclosed by the housing and extends through the housing for connection to a prime mover 16, such as an electric motor, expansion turbine, or the like. Bearings 18 and 20 support the shaft in free rotation within the housing.

Mounted on shaft 14 and secured thereto is rotor 22 within a rotor compartment 13 inside the housing 12, having side walls 24 and 26 and peripheral wall 28. Side walls 24 and 26 preferably taper inwardly toward one another at increasing radial distance so that the width of the rotor diminishes toward the periphery.

The portion of the shaft 14 contained within the housing is hollow and serves to conduct a vapor axially into and out of the rotor compartment 13. The vapor enters the housing through flanged conduit 30, passes through ports 32 into one end of the hollow shaft 14 and flows axially to fluid-tight wall 34, positioned transversely across the shaft. The vapor then passes out of the shaft through ports 36 therein, and flows radially outwardly in the clearance passage between rotor side wall 24 and the housing 12. When near the periphery, the vapor passes into the rotor through ports 38 located in wall 24 and enters the kettle 40 of the rotor upstream of the outermost contacting element 56 of the rotor.

The liquid enters through a rotating conduit 42 which passes centrally through that portion of the hollow shaft traversed by the incoming vapor. The liquid may be introduced from a fixed conduit (not shown) into rotating conduit 42 through a suitable rotary seal (not shown) connecting the two conduits. Conduit 42 is sealed fluid-tightly into shaft end wall 44.

The liquid passes through conduit 42 which is sealed at its inner end to an opening in partition 34. A second partition wall 49 across the hollow shaft is spaced axially from wall 34 leaving a disc-shaped passage 50 therebetween. The passage 50 is extended radially outwardly and annularly by the flanged annular partition wall 49 that is spaced from, but secured at its flanged end to side wall 24 of the rotor 22. Passage 50 terminates inwardly of the innermost contacting element 60. The liquid passes radially outwardly through passage 50 and then enters a plurality of manifold tubes 52 which are secured to wall 49 and are open to passage 50 at points around its periphery. Manifold tubes 52 extend axially of the rotor inwardly adjacent the innermost contacting element 60. Reflux feeder tubes 54 join to each manifold tube 52 and extend radially outwardly to deliver liquid to innermost contacting element 60.

A number of annular concentric contacting elements 56, 57, 58 and 60 are provided within the rotor and are secured radially apart by attachment to rotor side walls 24 and 26. While only four such contacting elements are shown in FIG. 1 for simplicity, it will be understood that the number required to obtain the desired mass transfer will be provided.

In the rotor, the centrifugal force field produced by spinning the rotor drives the liquid outwardly toward the periphery. The vapor is forced to flow inwardly, countercurrently to the flow of liquid, by raising the feed pressure of the vapor to an adequate level above its withdrawal pressure. The liquid is contacted by the vapor step-wise from element to element and the transfer of a component between the fluids becomes progressively more complete. Finally, the liquid collects in pool 62 within kettle 40 and is ejected from the rotor through trapped outlet passage 64. The ejected fluid accumulates within peripheral collection manifold 66 between the housing and the rotor and is withdrawn through discharge connection 68.

The vapor entering into kettle 40 passes step-wise through contacting zones of the several contacting elements, as will be more fully described below, and engages in the above mentioned progressive transfer of a component between the fluids. It emerges in head space 70 of the innermost element 60, passes through ports 72 in hollow shaft 14, flows axially out of the rotor compartment and is withdrawn from the rotating contactor through shaft ports 74 and passage 76.

In the above described assembly, suitable rotary seals 78, 80, 82, 84 and 86 prevent leakage between the various streams or to the surrounding atmosphere.

Figure 2:
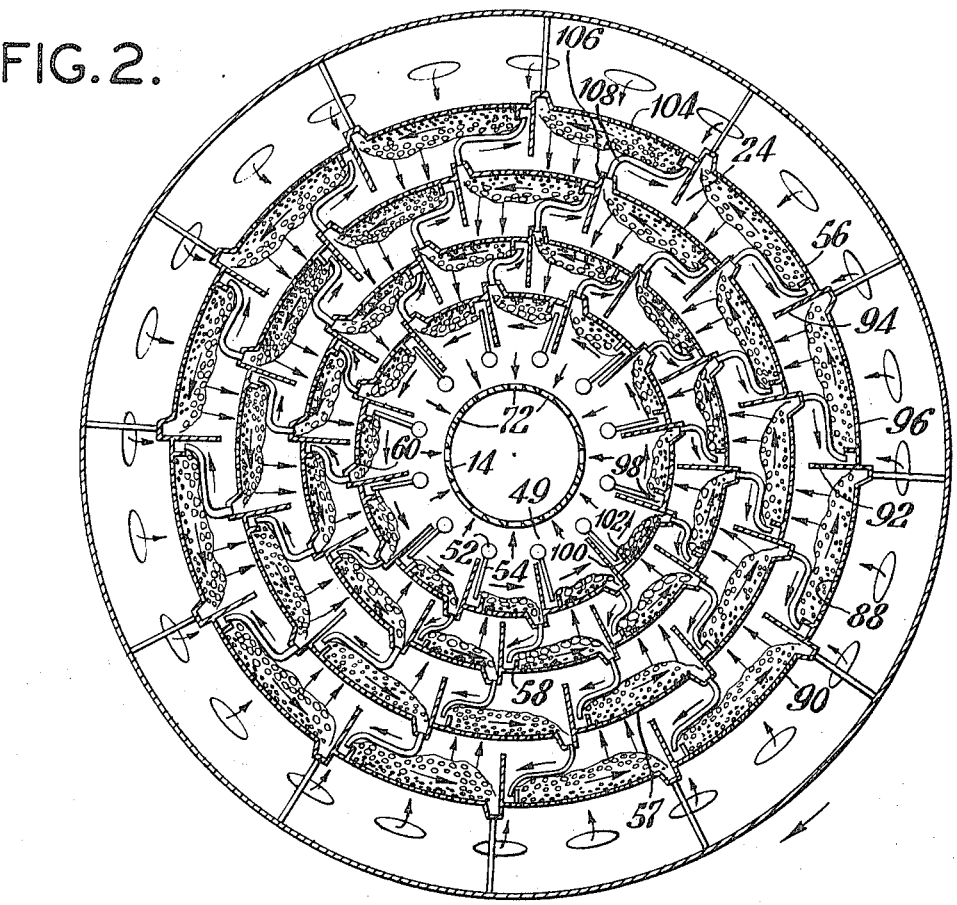
FIG. 2 is a partial, schematic cross-section taken normal to the axis of a rotating contactor along line 2—2 of FIG. 1, illustrating only the rotor in one embodiment of the invention.
Figure 3:
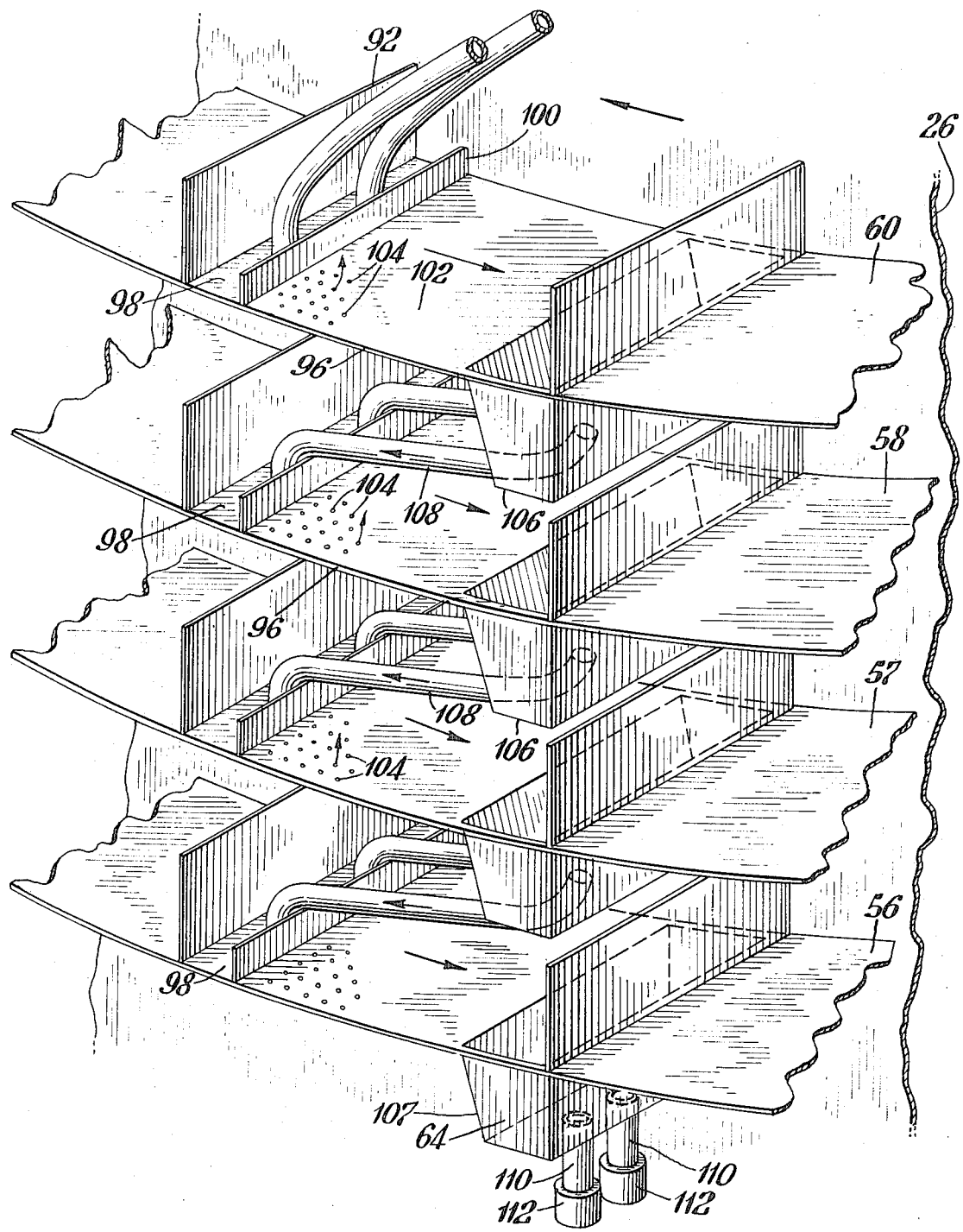
FIG. 3 is an isometric fragmentary view of the rotating contacting elements employed in the embodiment of FIG. 2.

The contacting elements 56, 57, 58 and 60 shown only schematically in FIG. 1, are illustrated more clearly in FIGS. 2 and 3. FIG. 2 shows the disposition and flow of liquid and vapor in an operating rotor. FIG. 3 shows greater detail in the construction of the elements. Items corresponding to those of FIG. 1 bear the same numbers.

Each annular contacting element has an inner surface 88 which faces the axis of revolution of the surface, and an outer surface 90 which faces away from the axis of revolution. The term "axis of revolution" is used in the geometric sense, and is the axis about which a line may be revolved to generate the surface. For practical purposes, the axis of revolution should coincide with the axis of rotation so that the rotor is balanced statically and dynamically.

Walls or partitions 92, 94 are provided at intervals around the annular contacting elements and divide the elements into arcuate contacting trays 96. The walls are positioned across the width of the annular element and extend from the inner surface inwardly toward the axis of revolution. The end walls 92 and 94, together with side walls 24 and 26, serve to confine the liquid on the tray.

Liquid introduced near the center of rotation is divided among manifold tubes 52 and flows generally radially outwardly through feeder tubes 54. The feeder tubes terminate over a fluid receiving zone 98 adjacent one end wall of a tray on the innermost contacting element 60. The liquid delivered to the receiving zone flows over weir 100 onto the contacting zone 102 of the tray. The weir forms the liquid into a uniform depth stream distributed across the width of the contacting zone and helps substantially toward initiating bubbling at the inlet end of the tray.

The liquid flows along the arcuate length of the contacting zone in a manner to be described hereinafter, and is penetrated by a plurality of streams of vapor. The vapor enters the contacting zone through apertures 104 extending through the tray and distributed uniformly over the contacting zone. The apertures are of such size as to produce a froth or emulsion of the vapor and liquid. The depth of the froth or emulsion depends upon the feed rates of vapor and liquid, upon the amount of liquid holdup on the trays and upon the intensity of the centrifugal field acting on the trays. The radial spacing between the trays must be sufficient to accommodate the froth depth and to provide disengagement space between the froth surface and the outer surface of the next contacting zone in the inwardly path of the vapor.

When the liquid has traversed the contacting zone of a tray, it falls into outlet trough 106 adjacent the other end wall of the tray. The trough is constructed of solid walls without apertures, and residual bubbles of vapor contained in the liquid are quickly disengaged and released from the liquid within this zone. The liquid, substantially free of vapor, is passed radially outward from outlet trough 106 through downcomer conduits 108 leading to the receiving zone of a tray of the outwardly adjacent annular contacting element. The discharge ends of conduits 108 are immersed in the liquid held on the receiving zone 98 to seal the conduit against vapor flow therethrough.

The force available for liquid transport radially from tray to tray is the centrifugal field created by rotating the tray assembly. At rates of rotation within the scope of this invention, this force field may be extremely high to promote large throughput.

The centrifugal force field also acts upon the liquid while still on the contacting zone and tends to drive the liquid through the apertures, thus producing undesirable weeping. Such "weeping" is the normal mode of operation of many prior art devices which do not attempt to hold up the liquid upon a lateral-flow contacting zone, but instead expel or spray the liquid radially outward through the apertures. These same apertures are often shared by the counterflowing vapor. Thus, a plurality of downcomers handling heavy liquid exclusively, are usually absent from prior art rotary contactors.

In the present invention, a more efficient contacting element is obtained by holding the fluids in controlled contact and by transferring the liquid from element to element via discrete downcomers. Weeping is avoided in general by providing apertures of appropriate small size and number so that the desired flow rate of vapor will create the radial pressure drop from tray to tray needed to support the froth. This pressure drop due to vapor flow through the apertures is called the dry plate pressure drop, $h_D$, and is distinct from the pressure drop further sustained by the vapor due to the hydrostatic pressure $h_s$ of the froth supported against the tray. In the design of fluid contact trays of the bubbling type, a limitation is imposed on $h_D$ in terms of $h_s$ in order that the tray will be stable and will not weep. This requirement can be expressed as $$h_D \geq C h_s$$

which states that the value of $h_D$ must be at least equal to some fraction C of $h_s$. In spray or packed columns and in wetted wall columns, this relationship is not applicable because a supported layer of froth does not exist to produce a hydrostatic head $h_s$. By the same token, there is no need or intent to avoid weeping. In sieve trays of the static type, the relationship is applicable and the value of C is properly chosen to be $\geq 0.5$ so as to avoid weeping. However, it has been found that for contactors operating in the high force fields employed in this invention, the value of C need only be $\geq 0.15$ to obtain satisfactory stability. The reason for the permissibly low $h_D$ is obscure but may indicate that the continuous phase through the froth is the vapor rather than the liquid.

The number and size of apertures should preferably be such that $h_D$ is not a significantly larger fraction of $h_s$ than necessary for stability under all normal conditions of service. Otherwise, unnecessary power will be expended in compressing the vapor for flow through the contactor. In the usual services contemplated for this invention, the value of C need not be greater than about 0.4.

The number and size of apertures appropriate for obtaining the desired value of $h_D$ will vary widely depending upon physical properties of the fluids and the pressure level of operation. Innumerable combinations of the number and size of apertures are possible to achieve a given value of $h_D$. In general, small apertures are preferred because they obtain better dispersion and greater surface area in the mixed fluids, but this must be balanced economically against cost of tray materials and the energy losses due to surface tension which the vapor also sustains in penetrating the liquid. For very low, e.g., subatmospheric pressure operation, large apertures or a great number of apertures are desired to minimize vapor energy losses consistent with the low driving force.

The avoidance of weeping on the circumferential-flow trays of this invention also requires a low substantially uniform depth of froth along the arcuate length of the contacting zone. We have discovered that a low uniform froth depth cannot be obtained if the froth in any contacting zone or portion thereof is required to flow in the same circumferential direction as tray rotation. Froth which must flow forward in the same direction as the tray in order to reach a downcomer, will build up to excessive depth and will cause severe weeping in the over-burdened zones. On the other hand, froth which flows counter to tray rotation will have substantially less tendency to weep through the apertures. The froth flows smoothly with more uniform aeration and depth and with much less tendency to weep.

The above phenomenon is believed due to several factors: First, liquid discharged onto the rotating tray has a natural tendency to slip or decelerate toward a state of lower kinetic energy. When liquid flows counter to tray rotation, this tendency to slip promotes the transport of fluid from inlet to outlet. However, when the liquid flows in co-rotation with the tray, it cannot slip, but instead must actually accelerate to a tangential velocity higher than that of the tray, i.e., it must acquire energy rather than lose energy. In the co-rotational case, the acceleration of the liquid with respect to the tray occurs quite gradually and the average time required for the liquid to traverse the tray is longer than for the counter-rotational case. As a result, the froth builds to greater depths.

Second, the co-rotational case requires a relatively high hydraulic gradient to accelerate fluid flow to a circumferential velocity faster than the tray. The high gradient tends to channel the light fluid away from the over-burdened inlet region of the contacting zone, and preferentially toward the more lightly burdened outlet region. The inlet region tends to be inactive while other regions are over-aerated. In contrast, the normal deceleration of flow in the counter-rotational case assists the transport of fluid across the tray and tends to reduce the hydraulic gradient.

Third, the forward acceleration of the fluid in the co-rotational case will increase its centripetal acceleration toward the center of rotation. Therefore, the reaction of the fluid against the supporting tray is higher and its tendency to weep is greater. In contrast, the fluid deceleration which occurs in the counter-rotational case reduces its centripetal acceleration, its reaction against the tray and its tendency to weep.

An inlet weir has been found to contribute significantly to the stability and uniform aeration of counter-rotational trays. Unaerated liquid at the inlet region of the contacting zone exerts a much higher hydrostatic pressure against the tray than does the aerated liquid further along the contacting zone. Consequently, the zone of transition from clear to aerated fluid is prone to weep. In counter-rotational trays, a simple weir at the tray inlet acts as a bubbling promoter. Aeration of the clear fluid flowing over the weir occurs almost instantaneously, and inlet weeping is avoided. This is attributed to the higher tangential velocity over the crest of the weir, which higher velocity being in the counter-rotational direction, results in the aforementioned reduction in centripetal acceleration and tray reaction. In co-rotational trays, an inlet weir is not beneficial because the higher forward velocity over the weir will increase centripetal acceleration and tray reaction.

The counter-rotational tray and its mode of operation also benefit performance of the outlet zone of the tray where residual vapor disengages from the liquid. In counter-rotation, the front which has decelerated in flow across the tray is suddenly and abruptly re-accelerated to tray velocity as it reaches the wall or partition at the tray outlet. This zone of re-acceleration is highly conducive to disengagement of the fluids prior to their transfer to the next succeeding contacting step in the series. In contrast, there is no significant change in froth velocity at the outlet region of a co-rotational tray. Incompletely disengaged vapor will be recirculated through the downcomer to the preceding tray and will reduce efficiency. Moreover, if the downcomer liquid is partially aerated, it will not flow as freely as clear liquid.

FIG. 3 shows an array of concentric contacting elements against a rotor wall 26 — the other wall having been removed. The tubular downcomer conduits 108 can be seen extending from outlet troughs 106 to receiving zones 98. Contacting zones 102 are uniformly perforated sheet metal. If desired, end wall 92, fluid receiving zone 98, and weir 100 may all be formed as a unitary channel member bonded against a continuous circle of the perforated sheet metal. A simple design is illustrated for the trapped outlet passage 64 in outermost contacting element 56. Outlet trough 107 of this element is provided with short outlet conduits 110 terminating in fluid sealing cups 112. The cups 112 maintain a pool of clear liquid which immerses the open ends of the conduits. The pool should be of sufficient depth to prevent vapor from penetrating the conduits because such vapor flow would bypass the fluid contacting zone of the tray.

Figure 4:
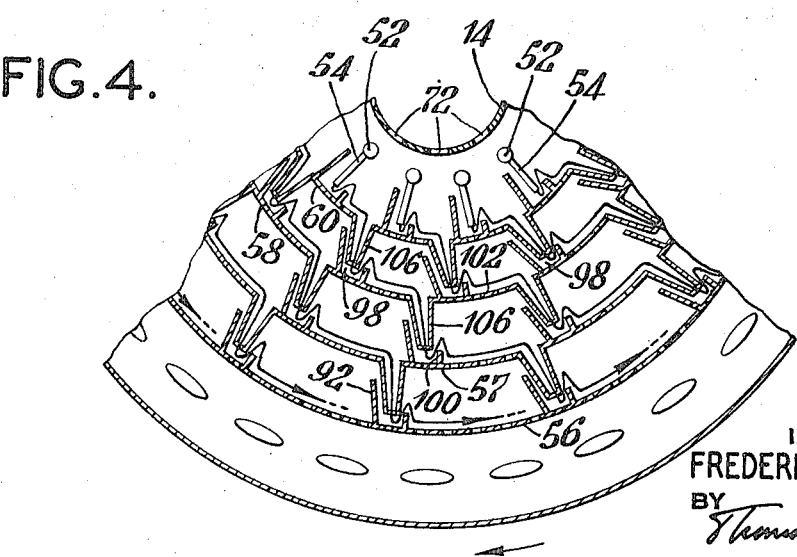
FIG. 4 is a schematic frequency cross-section similar to FIG. 2 but illustrating another embodiment of the invention.

FIG. 4 shows an alternative tray arrangement which differs from FIGS. 2 and 3 primarily in the downcomer location. FIG. 4 would result from an angular re-positioning of the contacting elements so that the downcomer troughs are approximately in radial alignment through the array. With such an arrangement, the outlet troughs 106 may be extended to form converging chutes which discharge heavy fluid directly into the receiving zones 98 of the outwardly adjacent contacting element. The trough extensions then serve the purpose of the downcomer conduits of the FIG. 2 and 3 arrangement. The end of such trough extension should be immersed in the liquid held within the receiving zone, thereby providing a vapor seal for the downcomer.

The radially aligned downcomers of FIG. 4 are mechanically simple and inexpensive. However, the off-set downcomers of FIGS. 2 and 3 have a functional advantage whenever substantial flow variation is anticipated through the rotary contactor. At very high flow rates of liquid, the contacting zone near the outlet may begin to weep as the extraordinary quantity of liquid is suddenly re-accelerated against the end wall. Should this occur with radially aligned downcomers, the weeping fluid will be thrown directly into the downcomer of an outwardly adjacent tray and will by-pass the succeeding contacting element entirely. However, with off-set downcomers, any fluid which weeps from the outlet zone will be thrown onto the contacting zone of an outwardly adjacent tray and will flow across at least a portion of such contacting zone before reaching a downcomer.

In a concentric array of annular contacting elements, all containing the same number of trays, the arcuate length of the trays will become greater at increasing radial distance from the axis of revolution. In preferred practice of this invention, foam depths are held very low, and the extra length of trays on larger diameter elements affords the opportunity to increase the number of trays per element, and to divide the liquid flow into a larger number of smaller fractional streams. The lower flow rate of liquid directed to each tray results in reduced foam height. One suitable practice is to limit tray length variation to a factor of 2. For example, if the shortest tray length in the array is 0.5 ft. then the longer trays should not exceed 1.0 ft.

Figure 5:
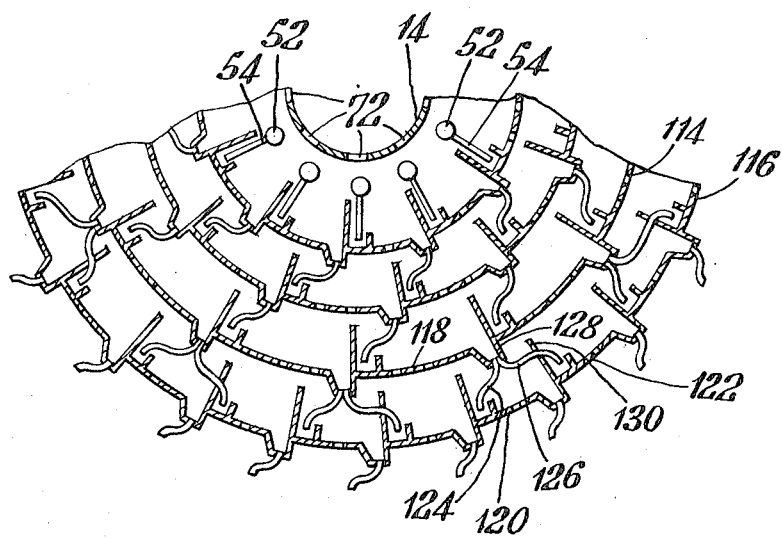
FIG. 5 is a schematic fragmentary cross-section also similar to FIG. 2 but illustrating yet another embodiment of the invention.

In rotary contactors with many concentric contacting elements, excessive tray lengths can be avoided by periodically increasing the number of trays per element as the elements increase in diameter through the array. A convenient method of increasing the number of trays per element is illustrated in FIG. 5 which is a partial, segmental section of a rotor showing four of the elements thereof. According to this method, a "two-for-one split" is imposed at appropriate radial intervals, for example, between elements 114 and 116 of FIG. 5. Thus, the trays per element are abruptly doubled in number and the liquid withdrawn from tray 118 of element 114 preceeding the split is divided equally between two trays 120 and 122 of element 116 following the split. The equal division of the liquid is readily accomplished when multiple downcomer pipes 124, 126 are provided with each outlet trough 128, by merely directing half the downcomer pipes from the outlet trough to the receiving zone of tray 120 and the other half to the receiving zone of tray 122. When it is necessary that downcomer pipes pass through an end wall of a tray, for example, pipe 126 through wall 130, holes or slots can be provided in the wall at appropriate locations. Special sealing techniques at such intersection will not normally be required because the fluids on either side of the wall are not much different in composition or potential head.

It will be understood, however, that the number of trays on succeeding elements can be increased by any integer or ratio which is desired. This can be done by mixing the liquid withdrawn from a number of trays of one contacting element and redistributing it among a larger number of trays on the next outward contacting element.

When the number of trays per element is changed at some radial level in the array, vapor will re-distribute itself provided that the end walls 92 and 94 afford circumferential communication between trays in the disengagement space radially inward of the normal foam level on the trays. Such is the arrangement for example, in FIG. 3 where the end walls are lower in height than the radial spacing between contacting elements.

When many contacting elements are arranged concentrically, it is preferable to vary the radial spacing between elements. The centrifugal force field acting on elements near the center of rotation will be relatively low, the foam heights will be relatively high, and spacing between elements should be relatively large. The opposite is true near the periphery of the rotor where the force field is higher, the foam heights lower and spacing permissibly smaller. This densifying effect of the force field on the foam height is quite pronounced.

The width of the contacting elements should preferably vary from wider dimension near the center of rotation to narrower dimension near the periphery. The preferred width $b$ of any element of diameter $D_t$ may be calculated from the following equation:

$$W_1/\rho_v = V_s \pi D_t b/f_a$$

where

| | |
|---|---|
| $W_1$=weight rate of vapor flow | lb/sec. |
| $V_s$=superficial vapor velocity based on active tray area | ft/sec. |
| $\rho_v$=vapor density | lb/ft$^3$ |
| $D_t$=tray diameter | ft. |
| $b$=tray width | ft. |
| $f_a$=active area fraction of tray | dimensionless |

The active area fraction of the tray, $f_a$, is the fraction of the total tray which is perforated — in other words, it denotes the contacting zone of the tray. The total tray area, of which the active area is a part, includes the receiving zone and the area occupied by the outlet zone.

When the element width variation is substantial through the array, the rotor side walls are preferably tapered or contoured as shown in FIG. 1. When the variation is small, the rotor and the elements may be uniform in width, and the effective width of the trays may be reduced progressively toward the periphery by attaching bars of filler material of appropriate width along the side margins of the contacting zones of the trays.

The performance quality of rotary contacting elements may be expressed by the following equation:

$$NTU = k D_g^{.8} h_f N_g^{.85}/V_s^3$$

where

| | |
|---|---|
| NTU=number of transfer units | dimensionless |
| k=constant, characteristic of the type of contacting element employed | dimensionless |
| $D_g$=gas diffusion coefficient | ft$^2$/sec. |
| $h_f$=foam height | inches |
| $N_g$=number of gravities equivalent to the centrifugal force field | dimensionless |
| $V_s$=superficial vapor velocity based on the active (apertured) area of the tray | ft/sec. |

Figure 6:
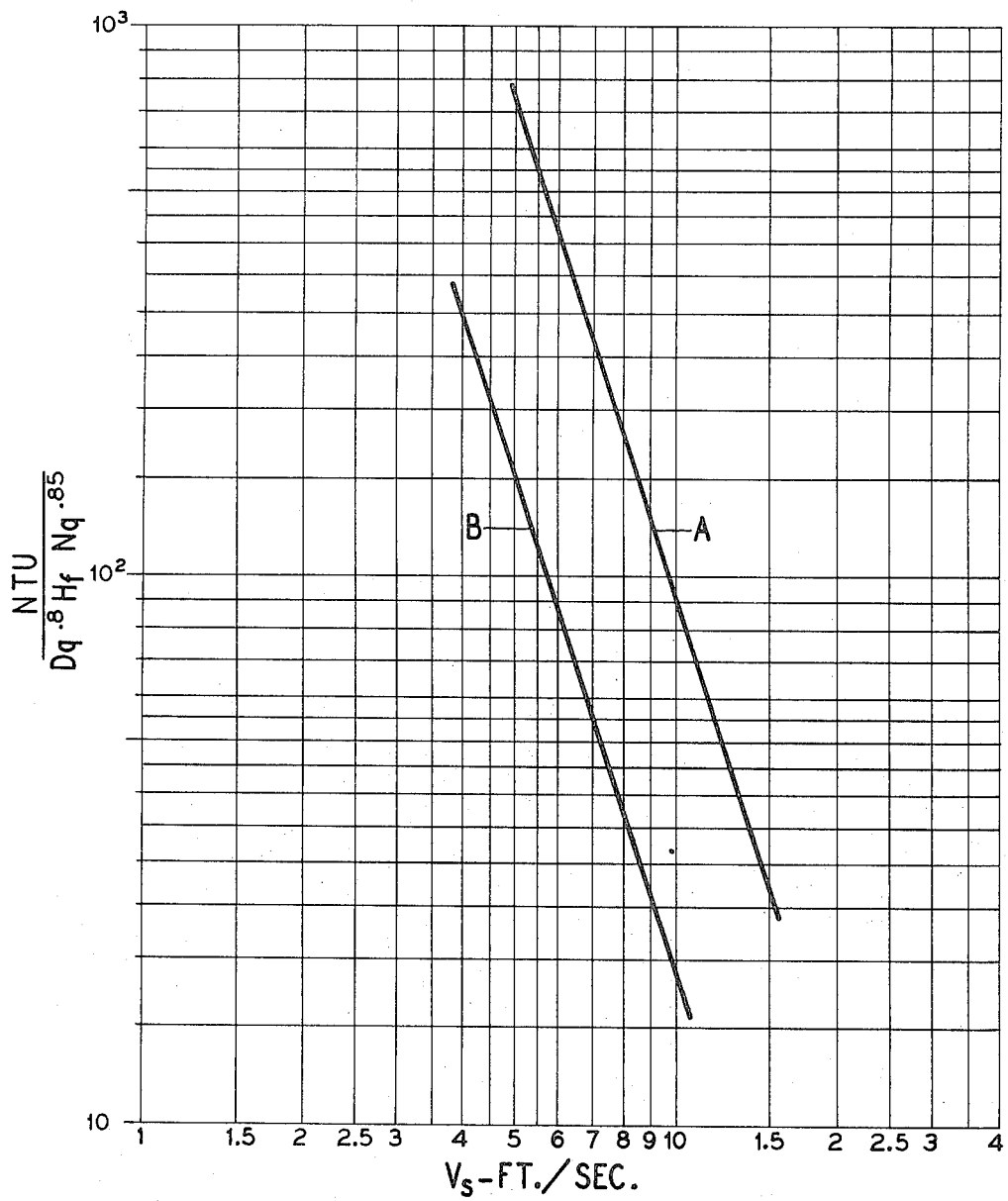
FIG. 6 is a graph comparing the efficiency of the contacting trays of this invention with a tray typifying the prior art.

FIG. 6 is a graph based on the foregoing equation comparing the performance of the counter-rotational tray of this invention (Curve A) with that of a tray typifying the prior art (Curve B). The curves correlate data taken on trays operated over a wide range of conditions and with fluorocarbon fluid systems. The values of constant $k$ determined for trays A and B are $9 \times 10^4$ and $1.85 \times 10^4$, respectively.

The data for Curve A was collected from tests on two fluid systems: dichlorodifluoromethane - dichlorotetrafluoroethane and dichlorofluoromethane - dichlorotetrafluoroethane. Some of the tests were conducted with a single tray of four inches arcuate length and three inches width with 20% free area (fraction of the contacting zone occupied by the aperture openings) provided as 0.033-inch perforations. Receiving and outlet zones occupied 34% of the tray area, leaving 66% active area. Other tests used several such trays spaced radially apart to provide a plurality of stages. Still other tests employed four annular concentric contacting elements each having 14 trays and assembled in a rotor about 30 inches diameter. Test conditions were varied over the following ranges:

| | |
|---|---|
| Centrifugal field, $N_g$ | 12.6 to 459 |
| Pressure, psia | 47 to 105 |
| Superficial vapor velocity, $V_s$ ft/sec. | 5.5 to 12.8 |
| Liquid rate, $Q_{Lib.}$ ft$^3$/sec.×ft. | 0.007 to 0.055 |
| Foam height, inches | 0.1 to 2.0 |

The data for Curve B was collected from tests on a tray of the corrugated type which, in a high-gravity field, was found to perform in the manner of a spray packing. The tray or grid was 4 inches arcuate length and 3 inches wide and was prepared from sheet metal having 0.038-inch perforations with a free area of 34% to 45%. Two V-shaped corrugations each 0.5 inch wide and 0.5 inch deep were formed across the width of the tray and located about three-fourth inch on either side of the center of the arc length of the grid. Some tests were conducted on a single tray, and others on four trays spaced radially apart to simulate a "column." The fluid system was dichlorodifluoromethane - dichlorotetrafluoroethane. Test conditions covered these ranges:

| | |
|---|---|
| Centrifugal field, $N_g$ | 51 to 469 |
| Pressure, psia | 74 to 97.5 |
| Superficial vapor velocity, $V_s$ ft/sec. | 4.3 to 15.4 |
| Liquid rate, $Q_{Lib.}$ ft$^3$/sec.×ft. | 0.019 to 0.146 |
| Foam height, inches | 0.4 to 2.5 |

For comparison, assume that a tray of each type A and B is operated under similar conditions, i.e., the same fluid system, equal liquid and vapor throughput, equal pressure and equal diameter and rotational speed. At the appropriate value of $V_s$ the corresponding values for the ordinate term $NTU/(D_g^{.8} \times h_f \times N_g^{.85})$ can be read from FIG. 6 for each tray. Since $D_g$ and $N_g$ are the same for both trays, the ordinate values serve to compare the number of mass transfer units ($NTU$) provided by each tray per unit of foam depth ($h_f$) sustained on each tray.

A high performance tray is characterized by a high value of $NTU$ and by a low foam height at given liquid and vapor throughput. This allows the number of trays and the tray spacing to be small and requires a rotor of low diameter. FIG. 6 shows that the ordinate term, denoting such qualities, is about 4.7 times greater for the tray of this invention than for the corrugated tray.

The corrugated tray is a fair representation of spray type packings inasmuch as it improves upon simple perforated packings designed to spray liquid from the entire "active" area of the grid. The corrugated tray provides discrete liquid transfer zones and requires some circumferential flow of the liquid in order to reach these liquid transfer zones. Thus, the liquid is retained on the grid and the contact time is prolonged. Despite such improvement, the corrugated tray exhibited the functional characteristic of spray packing in that the NTU's tended to be independent of the number of contacting elements provided in a given radial "height" of column.

In other tests of the invention, the effectiveness and the efficiency of the contacting trays of the invention were demonstrated for the separation of air into oxygen and nitrogen. Four concentric contacting elements were employed, each containing seven trays of the type illustrated in FIG. 3. The trays were 0.040 inch thick and their contacting zones contained 0.032 inch perforations uniformly distributed and of a number to occupy 14% of the contacting zone area. A ⅜ inch high inlet weir was provided. Other dimensions of the trays and elements were:

| Element No. | Radius of Revolution inches | Tray Width, inches | Tray Length, inches | Active Area ft² |
|---|---|---|---|---|
| 1 | 9.25 | 2.5 | 6.4 | 0.78 |
| 2 | 11.25 | 2.0 | 8.2 | 0.81 |
| 3 | 13.25 | 1.7 | 10.0 | 0.84 |
| 4 | 15.25 | 1.5 | 11.8 | 0.86 |

These tests were not designed to upgrade air into substantially pure constituents, but as stated above, were intended to show tray effectiveness and efficiency in this application. Such capability can be conveniently evaluated by introducing liquid and vapor of equal composition for respective radial outward and radial inward flows through the rotor. As will be understood by those skilled in the distillation art, the compositions of the vapor and liquid feeds can be located on the vapor-liquid equilibrium diagram for the mixture and, knowing the heat contents, pressures and mass rates of flow of both the feeds and products, the operating line between the feed points can be plotted. Then the number of theoretical stages necessary to produce the products from the feeds can be determined by graphical construction. The ratio of the number of theoretical stages to the number (four) of actual stages gives the average efficiency of the trays. This efficiency determination does not require a large purity difference between feeds. The modest driving force available with binary feeds of equal composition is sufficient.

The following ranges of conditions were obtained during the tests:

| | |
|---|---|
| Pressure P , psia | 43 to 75 |
| $N_a$ , dimensionless | 25 to 156 |
| Feed Composition X, % $O_2$ in $N_2$ | 20 and 50 |
| Liquid Rate, $Q_{Lib}$, ft³/sec.×ft. | 0.023 to 0.10 |
| Vapor velocity, $V_s$, ft/sec. (based on active area of tray) | 5.1 to 8.4 |
| Foam height $h_f$ , inches | 0.8 to 1.4 |

Tray efficiencies ranging between 32% and 65% of theoretical were observed in these tests. This is excellent performance when one considers the very high fluid loadings which were imposed upon trays radially spaced only two inches apart. It should be noted that the total liquid rate per unit width for a complete, annular element is seven times the liquid rate for a single tray given in the above listing.

The conditions and results obtained in three specific tests of the apparatus as described are given in Table I.

TABLE I

| Test No. | 1 | 2 | 3 |
|---|---|---|---|
| P | 43 | 75 | 45 |
| $N_a$ | 124 | 115 | 156 |
| X | 50 | 20 | 20 |
| $Q_{Lib}$ | 0.10 | 0.074 | 0.061 |
| $V_s$ | 7.6 | 6.8 | 8.4 |
| $h_f$ | 1.0 | 1.2 | 1.25 |
| Efficiency | 53 | 65 | 65 |

What is claimed is:

1. A method for contacting a liquid and a vapor for mass transfer therebetween including the steps of:
   providing at least two arcuate contacting surfaces having a common axis of revolution, the arcuate contacting surfaces being spaced radially apart from one another at different radial distances from said axis and each having a fluid contacting zone thereon,
   rotating said arcuate surfaces about said axis in an angular direction and at a rate to produce a centrifugal force acting on said surfaces in excess of the gravitational field of the environment,
   introducing a stream of liquid to an inner arcuate contacting surface onto a receiving zone thereof and at an end of said surface which leads in the direction of rotation,
   flowing substantially the entire stream of liquid along the fluid contacting zone of said arcuate surface in an angular direction opposite to the direction of rotation of said surfaces,
   withdrawing said stream of liquid from said inner arcuate surface in a direction outwardly from the center of rotation and from the end of said inner arcuate surface which trails in the direction of rotation,
   introducing a liquid stream withdrawn from said inner arcuate surface to a radially adjacent outer arcuate surface onto a receiving zone thereof and at an end of said outer arcuate surface which leads in the direction of rotation,
   flowing substantially the entire liquid stream along the fluid contacting zone of said outer arcuate surface in an angular direction opposite to the direction of rotation of said surfaces,
   withdrawing said liquid stream from the outer arcuate surface in a direction outwardly from the center of rotation and from the end of said outer arcuate surface which trails in the direction of rotation,
   penetrating the liquid stream flowing along the contacting zone of said outer arcuate surface with a plurality of streams of a vapor flowing inwardly toward the center of rotation,
   separating said vapor from the liquid stream on said outer contacting surface, and
   penetrating the stream of liquid flowing along the contacting zone of said inner arcuate surface with a plurality of streams of said separated vapor flowing inwardly toward the center of rotation.

2. A method according to claim 1 wherein the liquid introduced onto a receiving zone of an arcuate surface is flowed over an inlet weir prior to flowing along said fluid contacting zone.

3. A method according to claim 1 wherein said plurality of streams of a vapor experience a dry plate pressure drop when flowing through the fluid contacting zone of an arcuate surface of between 15% and 30% of the hydrostatic pressure of the liquid on said surface.

4. A method for contacting a liquid and a vapor for mass transfer therebetween including the steps of:
   providing a plurality of annular, concentric contacting stages having a common axis of revolution and being spaced radially apart from one another at different radial distances from said axis, each of said stages containing at least one arcuate contacting surface with a fluid contacting zone thereon, the arcuate contacting surfaces of each said stage being positioned annularly about said axis at a common radial distance, rotating said plurality of stages about said axis in an angular direction and at a rate to produce a centrifugal force acting on said stages in excess of the gravitational field of the environment, introducing a stream of liquid to each arcuate contacting surface onto an inlet zone thereof and at an end of said surface which leads in the direction of rotation, flowing substantially the entire stream of liquid along said fluid contacting zone of an arcuate contacting surface in an angular direction opposite to the direction of rotation of said stages, penetrating said stream of liquid as it flows across said fluid contacting zone with a plurality of streams of a vapor, flowing inwardly toward the center of rotation, separating said vapor from the stream of liquid, withdrawing said stream of liquid from the arcuate contacting surface in a direction outwardly from center of rotation and from the end of an arcuate surface which trails in the direction of rotation, supplying the stream of liquid to each arcuate contacting surface of the innermost stage from without the plurality of stages, supplying the stream of liquid to each arcuate contacting surface of other of the plurality of stages from liquid withdrawn outwardly from each arcuate contacting surface of a stage inwardly adjacent to said other stage, discharging from said plurality of stages liquid which is withdrawn from each arcuate contacting surface of the outermost stage, supplying said plurality of streams of vapor to each arcuate contacting surface of the outermost stage from without the plurality of stages, supplying said plurality of streams of vapor to each arcuate contacting surface of other of the plurality of stages from vapor separated from liquid on each arcuate contacting surface of a stage outwardly adjacent to said other stage, and discharging from said plurality of stages vapor which is separated from liquid on each arcuate contacting surface of the innermost stage.

5. A method according to claim 4 wherein the number of streams of liquid supplied to all arcuate contacting surfaces of said inwardly adjacent stage is lesser than the number of streams of liquid supplied to all arcuate contacting surfaces of said other stage.

6. A method according to claim 4 wherein the liquid withdrawn from a contacting surface of said inwardly adjacent stage is divided into two portions and each portion comprises the stream of liquid supplied to a contacting surface of said other stage.

7. A method for separating a mixture comprised substantially of oxygen and nitrogen by rectification including the steps of:

providing a plurality of annular, concentric contacting stages having a common axis of revolution and being spaced radially apart from one another at different radial distances from said axis, each of said stages containing at least one arcuate contacting surface with a fluid contacting zone thereon, the arcuate contacting surfaces of each said stage being positioned annularly about said axis at a common radial distance, rotating said plurality of stages about said axis in an angular direction and at a rate to produce a centrifugal force acting on said stages in excess of the gravitational field of the environment, introducing a stream of liquid comprised of at least one component of said mixture to each arcuate contacting surface onto an inlet zone thereof and at an end of said surface which leads in the direction of rotation, flowing substantially the entire stream of liquid along said fluid contacting zone of said surface in an angular direction opposite to the direction of rotation of said stages, penetrating said stream of liquid as it flows across said fluid contacting zone with a plurality of streams of a vapor inwardly toward the center of rotation, comprised of at least one component of said mixture and richer in oxygen than said stream of liquid, separating said vapor from the stream of liquid, withdrawing said stream of liquid from the arcuate contacting surface in a direction outwardly from center of rotation and from the end of an arcuate surface which trails in the direction of rotation, supplying the stream of liquid as fluid rich in nitrogen to each arcuate contacting surface of the innermost stage from without the plurality of stages, supplying the stream of liquid to each arcuate contacting surface of other of the plurality of stages from liquid withdrawn outwardly from each arcuate contacting surface of a stage inwardly adjacent to said other stage, discharging from said plurality of stages liquid enriched in oxygen which is withdrawn from each arcuate contacting surface of the outermost stage, supplying said plurality of streams of vapor as fluid rich in oxygen to each arcuate contacting surface of the outermost stage from without the plurality of stages, supplying said plurality of streams of vapor to each arcuate contacting surface of other of the plurality of stages from vapor separated from liquid on each arcuate contacting surface of a stage outwardly adjacent to said other stage, and discharging from said plurality of stages vapor enriched in nitrogen which is separated from liquid on each arcuate contacting surface of the innermost stage.

8. An apparatus for contacting a liquid and a vapor for mass transfer therebetween comprising:

at least two arcuate contacting trays each having an inner arcuate surface facing an axis of revolution common to the arcuate surfaces of all trays and each having an outer surface facing away from said axis, said arcuate contacting trays being spaced radially apart from one another at different radial distances from said axis, a wall at each end of each said tray positioned transversely across the width of each tray and extending from the inner surface of each tray generally radially inwardly toward said axis, a liquid receiving zone on the inner surface of each tray adjacent a wall at one end thereof, a liquid outlet from each tray adjacent a wall at the other end thereof, each said outlet leading from the inner surface through the tray outwardly from said axis, a plurality of apertures through each tray intermediate the receiving zone and the outlet thereof, forming a contacting zone of each tray, means for introducing a stream of liquid onto the receiving zone of the innermost arcuate contacting tray, conduit means between radially adjacent trays connecting the liquid outlet of a tray and the liquid receiving zone of a tray outwardly adjacent thereto, means for directing a stream of vapor to the outer surface of the outermost of said arcuate contacting trays, open flow channel means associated with radially adjacent trays for conducting vapor from the inner surface of the contacting zone of a tray to the outer surface of the contacting zone of an inwardly adjacent tray, and means for rotating said arcuate contacting trays about said axis in an angular direction such that the receiving zone of each tray leads the outlet thereof in rotation and at a rate to produce a centrifugal force acting on said trays in excess of the gravitational field of the environment.

9. An apparatus according to claim 8 wherein a weir is positioned transversely across the width of each said tray on said inner surface between said liquid receiving zone and said contacting zone thereof.

10. An apparatus for contacting a liquid and a vapor for mass transfer therebetween comprising:

a plurality of annular, concentric contacting elements each having an inner surface facing a common axis of revolution of said inner surfaces and each having an outer surface facing away from said axis, said elements being spaced radially apart from one another at different radial distances from said axis, a plurality of walls positioned transversely across the width of each said contacting element and extending from said inner surface generally radially inwardly toward said axis, said walls dividing said element circumferentially and defining at least one arcuate contacting tray having walls at the ends thereof, the trays of each said element being positioned annularly about said axis at a common radial distance, a liquid receiving zone on said inner surface of each tray adjacent a wall at one end thereof, a liquid outlet from said tray adjacent a wall at the other end thereof, said outlet leading from said inner surface through said tray outwardly from said axis, a plurality of apertures through said tray intermediate said receiving zone and said liquid outlet forming a contacting zone of said tray, the arcuate contacting trays of said elements being oriented in the same circumferential direction such that said receiving zones and outlets are arranged in alternating sequence around said elements, means for rotating said elements about said axis in an angular direction such that on each tray said receiving zone leads said outlet in rotation, and at a rate to produce a centrifugal force acting on said elements in excess of the gravitational field of the environment, means for introducing liquid from without the plurality of elements onto the receiving zone of each tray of the innermost of said plurality of elements, means associated with adjacent elements for conducting liquid from the outlet of a tray of the inwardly adjacent element to the receiving zone of a tray of the outwardly adjacent element, means for introducing vapor from without the plurality of elements to the outer surface of the contacting zone of each tray of the outermost of said plurality of elements, and means associated with adjacent elements comprising an open flow channel for conducting vapor from the inner surface of the contacting zone of a tray of the outwardly adjacent element to the outer surface of the contacting zone of a tray of the inwardly adjacent element.

11. An apparatus according to claim 10 wherein said tray outlet of said inwardly adjacent element is radially aligned with the contacting zone of a tray of said outwardly adjacent element, and said liquid conducting means associated with said adjacent elements comprises a conduit extending outwardly and circumferentially between said tray outlet of the inwardly adjacent element and the receiving zone of said tray of the outwardly adjacent element.

12. An apparatus according to claim 10 wherein said tray outlet of said inwardly adjacent element is substantially radially aligned with said receiving zone of said outwardly adjacent element, and said liquid conducting means associated with said adjacent elements comprises a conduit extending substantially radially outwardly between said outlet and said receiving zone.

13. An apparatus according to claim 10 wherein said walls extend from said inner surface toward said axis a distance less than the radial spacing of adjacent elements thereby providing vapor communication between the trays of each element.

14. An apparatus according to claim 11 wherein the number of trays of said outwardly adjacent element is greater than the number of trays of said inwardly adjacent element, and said liquid conducting means associated with adjacent elements includes means for distributing the liquid withdrawn from the outlet of a tray of said inwardly adjacent element to receiving zones of a plurality of trays of said outwardly adjacent element.

15. An apparatus according to claim 11 wherein the number of trays of said outwardly adjacent element is twice the number of trays of said inwardly adjacent element, and said liquid conducting means associated with adjacent elements includes means for dividing the liquid withdrawn from the outlet of a tray of said inwardly adjacent element between the receiving zones of two trays of said outwardly adjacent element.

* * * * *